Aug. 29, 1967    W. E. BULMAN ET AL    3,339,129
HALL EFFECT APPARATUS
Filed Nov. 8, 1965    6 Sheets-Sheet 1
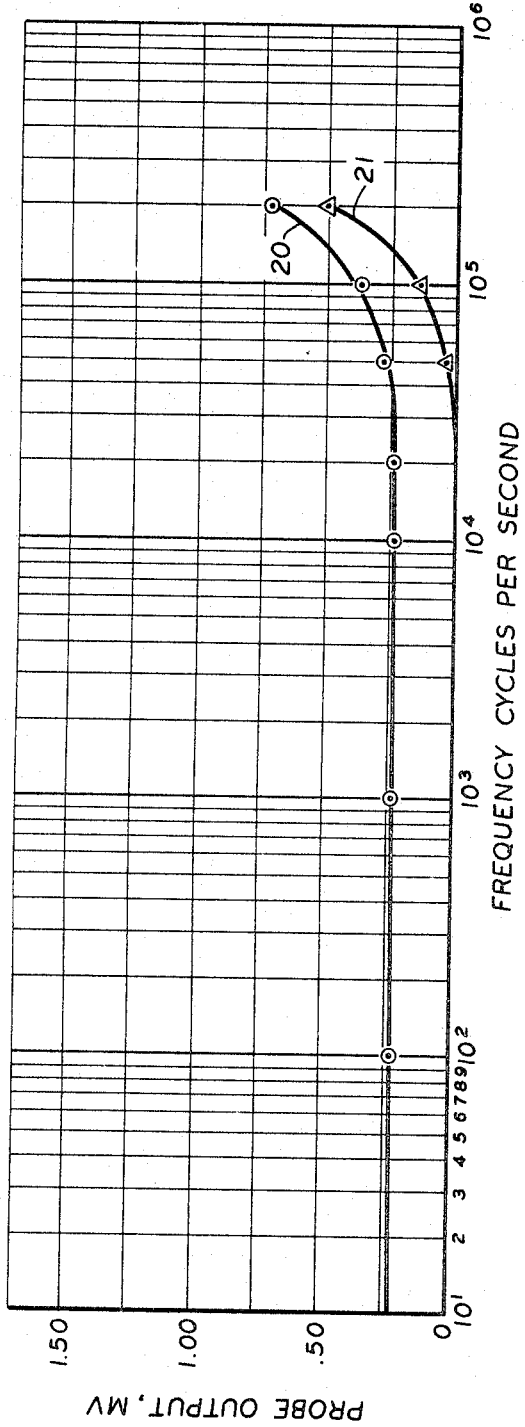
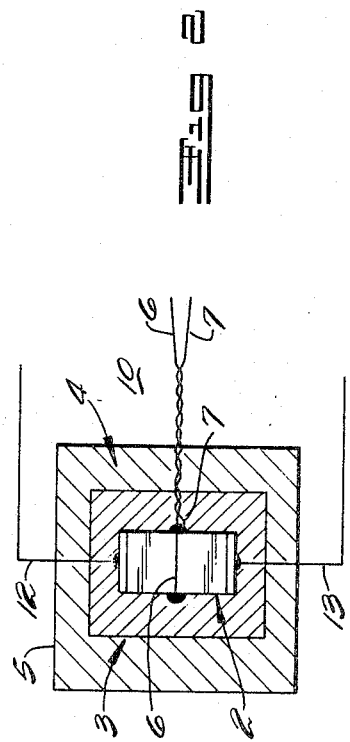
*INVENTORS*
*WARREN E. BULMAN,*
*ARTHUR E. MIDDLETON,*
BY *JON A. SANBORN, AND*
*JOSEPH W. HARPSTER*
*Denbigh S. Matthews*
ATTORNEY

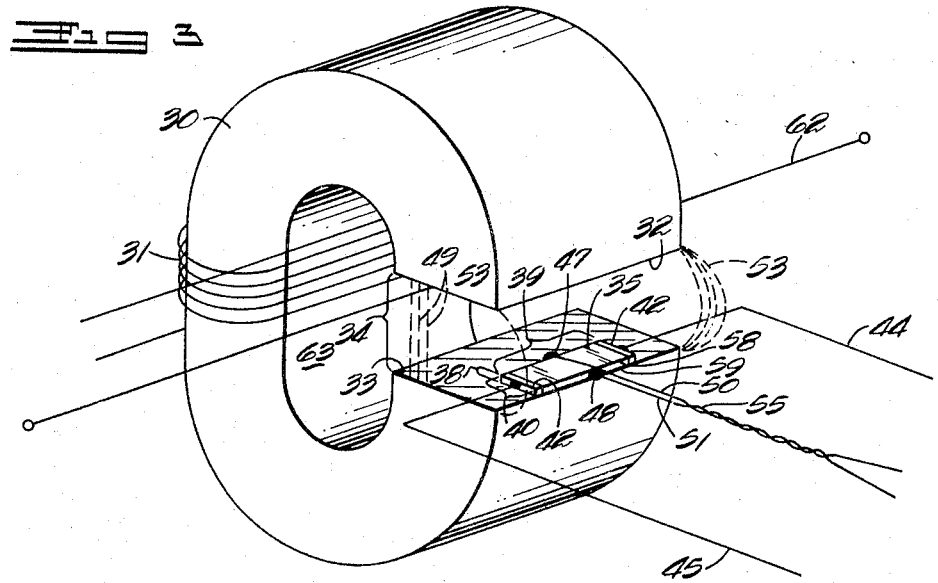
Fig. 3
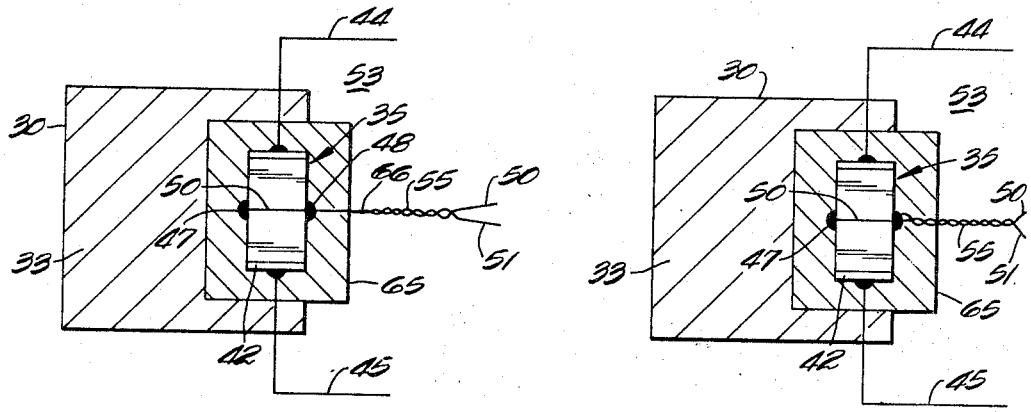
Fig. 4
Fig. 5

Aug. 29, 1967 W. E. BULMAN ET AL 3,339,129
HALL EFFECT APPARATUS
Filed Nov. 8, 1965
6 Sheets-Sheet 4
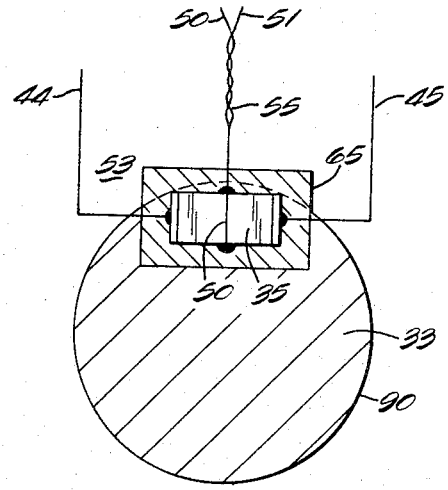
Fig. 7
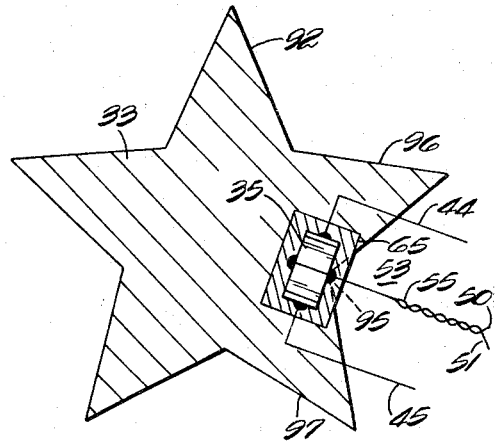
Fig. 8
Fig. 9
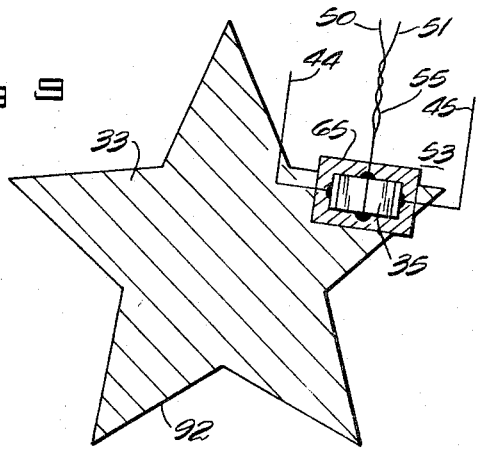
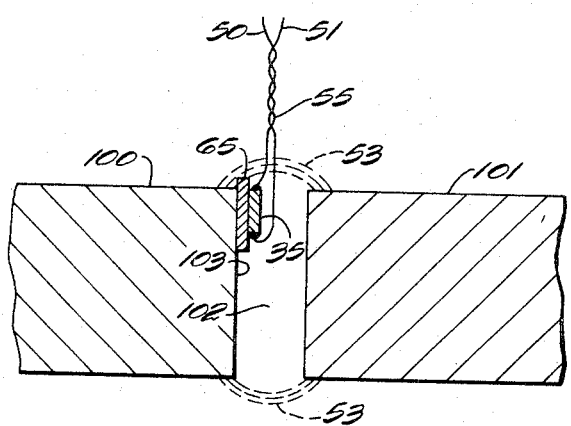
Fig. 10
INVENTORS
WARREN E. BULMAN,
ARTHUR E. MIDDLETON,
BY JON A. SANBORN, AND
JOSEPH W. HARPSTER
Denbigh G. Matthews
ATTORNEY

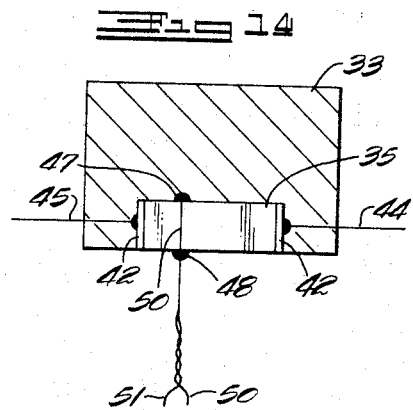
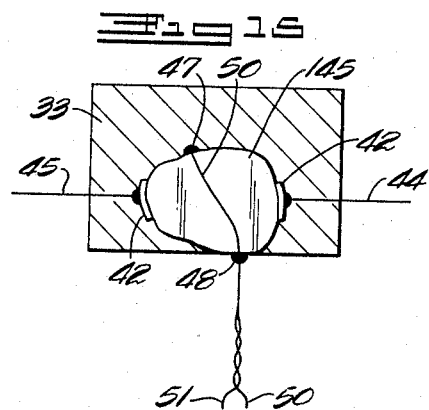
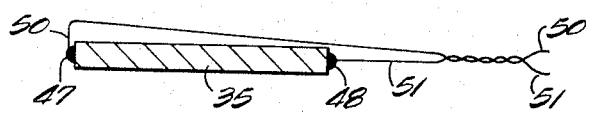
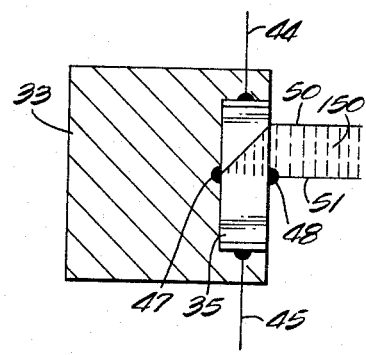
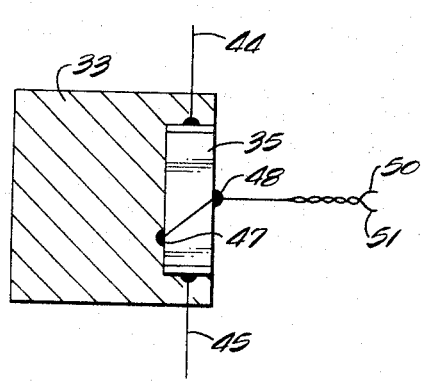
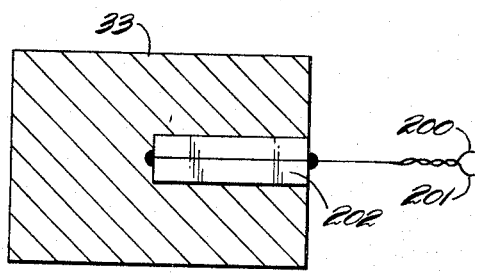
INVENTORS
WARREN E. BULMAN,
ARTHUR E. MIDDLETON,
BY JON A. SANBORN, AND
JOSEPH W. HARPSTER
Denbigh S. Matthews
ATTORNEY

United States Patent Office 3,339,129
Patented Aug. 29, 1967

3,339,129
HALL EFFECT APPARATUS
Warren E. Bulman, Arthur E. Middleton, Jon A. Sanborn, and Joseph W. Harpster, Franklin County, Ohio, assignors to Ohio Semitronics Inc., Clinton, Ohio, a corporation of Ohio
Filed Nov. 8, 1965, Ser. No. 506,707
20 Claims. (Cl. 317—235)

ABSTRACT OF THE DISCLOSURE

A Hall effect or other magnetic sensitive device element is placed in the air gap or on the pole of a high frequency responsive magnetic concentrator, asymmetrical to the pole face or faces, so that one voltage output lead from its contact point on the device element is totally outside the peripheral edge or edges of the pole face or faces, and the other voltage output lead on the opposite side of the element is folded over the element. Both output leads extend coplanar from the gap in a plane parallel to the magnetic flux to a point where the fringing flux has become negligible where the output leads may be twisted together. This asymmetrical arrangement of pole face and element together with this type of noninductive lead configuration reduces the inductive pickup voltage at high frequencies (also, of course, at low frequencies) by several orders of magnitude and allows such element-magnetic concentrator to be used to give output voltages which are independent of frequencies to greater than 10 megacycles per second.

---

This invention relates to magnetic devices such as a Hall effect apparatus, and especially a wide band Hall effect transient sensor. In particular, this invention relates to the minimization of inductive pickup contributions to voltage output of Hall effect devices or elements in magnetic circuits.

It is one of the principal objects of this invention to provide a magnetic circuit design comprising a high mobility majority carrier extrinsic semiconductor four terminal Hall element with associated lead configuration and with geometric relationships of the component parts which effectively reduces pickup voltages in the two voltage output terminals of the four terminal Hall element to values heretofore not achieved in any such magnetic circuit and which allows the sensing of magnetic field fluctuations of frequencies in excess of 10 megacycles per second.

It is another object of this invention to reduce the inductive pickup voltages in a magnetic circuit Hall effect sensor by several orders of magnitude.

It is yet another object of this invention to suppress the contribution of inductive pickup to the total voltage output at the Hall voltage leads of the Hall element to an insignificant contribution at magnetic field oscillation frequencies in the megacycle range.

It is still another object to provide a magnetic Hall effect sensor which will give a voltage output independent of the frequency of the magnetic field (a wide band transient detector).

It is a further object to provide a wide band Hall effect magnetic concentrator type of sensor which gives a constant voltage output for a given D.C. control current in the four terminal Hall element and a constant amplitude A.C. magnetic field provided by a magnetic core concentrator.

It is a still further object to provide a wide band Hall effect magnetic concentrator type of sensor whose voltage output is primarily determined by the magnetic flux induced in the magnetic concentrator by the magnetic component of electromagnetic radiation fields.

It is yet a still further object of this invention to provide a wide band Hall effect magnetic concentrator type of sensor whose voltage output is primarily determined by the magnetic flux induced in the magnetic concentrator by the magnetic component of the electromagnetic radiation fields characterized by frequencies in excess of 1 megacycle and as high as 20 to 200 megacycles per second.

These and other objects and advantages of the present invention will become more apparent, to those skilled in the art, from the following detailed description and claims taken in conjunction with the accompanying drawings, wherein like components in the various views are generally indicated by like reference numerals, in which:

FIG. 1 is a diagram or graph (semi-logarithmic, 5 cycles×70 divisions) illustrating the increase in inductive voltage in a Hall effect apparatus as conventionally constructed;

FIG. 2 is a top plan view of a portion of a typical Hall apparatus used to obtain the data for FIG. 1;

FIG. 3 is a perspective elevational view of a Hall apparatus of the present invention where the Hall element is placed asymmetrically in the air gap or on the pole face of the core and the output leads extend parallel out at least substantially beyond the fringing magnetic area before they may be twisted;

FIG. 4 is a top plan view of a portion of the apparatus of FIG. 3 in which the Hall element has been mounted on a substrate;

FIG. 5 is a top plan view of an apparatus arrangement similar to that shown in FIG. 4 but in which the output leads are twisted in the fringing area of the magnet;

FIG. 7 is a view similar to FIG. 4 in which the pole face is round;

FIG. 8 is a view similar to FIG. 4 in which the pole face is star-shaped;

FIG. 9 is a view similar to FIG. 8 showing a modification of the arrangement of FIG. 8;

FIG. 10 is a cross sectional view of an antenna structure employing the Hall element construction of the present invention;

FIG. 14 is a view similar to FIG. 4 in which the voltage output contacts and leads of the Hall element are displacement from the center of the element;

FIG. 15 is a view similar to FIG. 4 in which the Hall element is shown as being asymmetrical;

FIG. 16 is a view partly cross sectional showing an arrangement of the output leads of a Hall element to be used in the present apparatus;

FIG. 17 is a view similar to FIG. 4 where the voltage output leads are not coplanar and parallel to the field to produce inductive pickup;

FIG. 18 is a view similar to FIG. 4 in which the voltage contacts are not symmetrical but wherein the voltage leads do not produce inductive pickup; and FIG. 19 is a view similar to FIG. 4 in which the principles of the present invention are applied to a magneto-resistance device.

Figure 6:
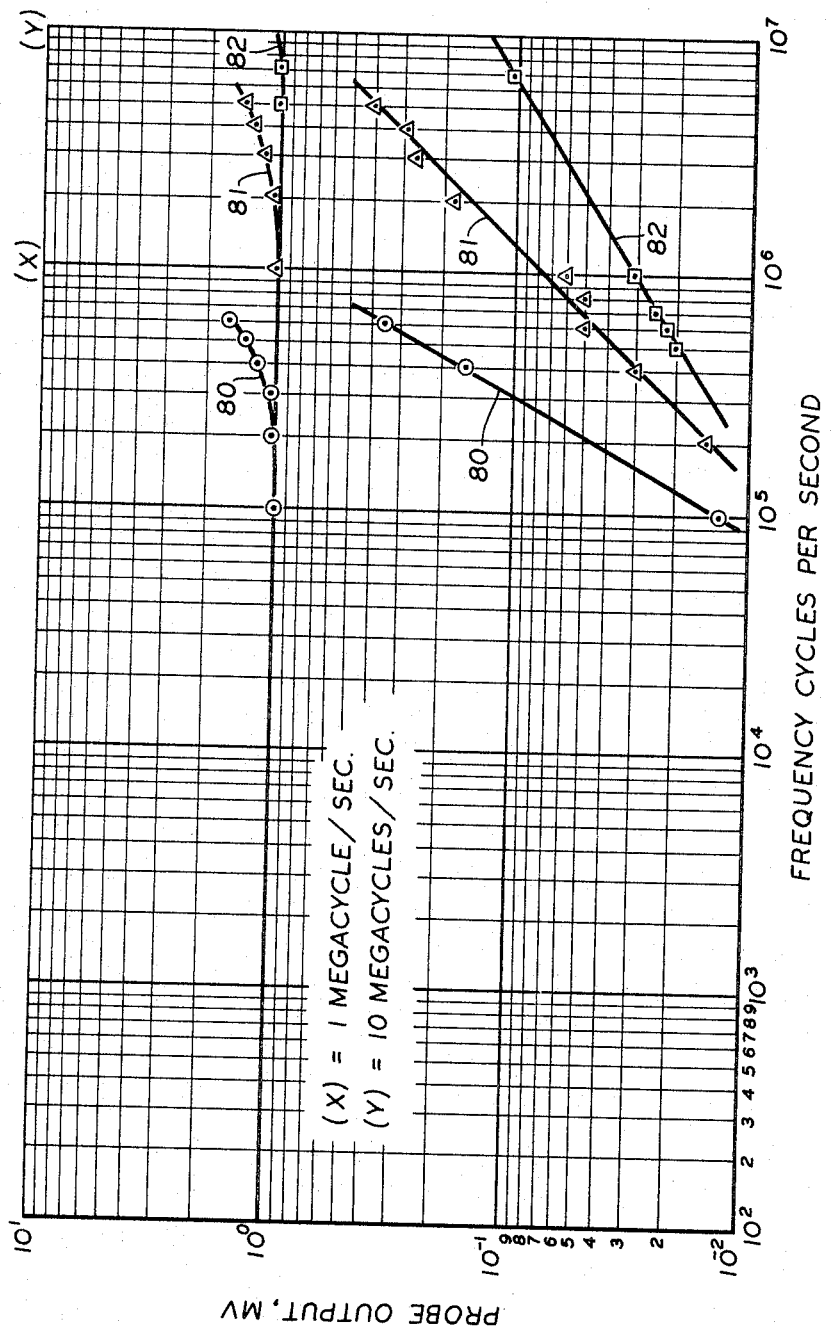
FIG. 6 is a diagram or graph (logarithmic, 3×5 cycles) illustrating the increase in the range of frequency response of a Hall apparatus as presently constructed as compared to other constructions.

Previously Hall effect magnetic circuit sensors have only been useful to approximately 50 kilocycles per second. This invention provides a Hall magnetic circuit sensor characterized by extending the frequency range to greater than 1 megacycle per second.

A Hall effect magnetic concentrator device involving a magnetic circuit as normally constructed comprises a Hall element (Hall effect device) positioned in the air gap of a magnetic core, minimizing the thickness of the Hall element and relatively the air gap width (between the poles of the magnetic core), and providing twisted lead and other noninductive lead configurations of the output leads of the Hall element to suppress inductive pickup voltages.

The Hall effect element is well known to give a voltage output, V, across its voltage output terminals which is proportional to the magnitude of the magnetic field component perpendicular to both the current through the Hall element and the plane of the voltage terminals which terminals are placed on opposite sides of the Hall element (plate or resistance body) such that a line drawn between them is also perpendicular to the control current flow through the Hall element, i.e., $$V = \frac{RIH}{t}$$

where $R$=Hall constant in cm.$^3$/coulomb, $I$=control current in amps, $H$=magnetic field in gauss, and $t$=thickness in cm. The voltage output, V, is well known to be inversely proportional to the thickness of the Hall element, $t$, and directly proportional to the control current, I, and magnetic field, H, in such a geometrical configuration.

The constant R is the Hall constant which is characteristic of the semiconductor material which comprises the Hall element and which takes values dependent on the number of charge carriers/cm.$^3$ in the Hall element, for example, $$R = \frac{\gamma}{ne}$$

where $\gamma$ is a constant $$= \frac{3\pi}{8}$$

(for extrinsic semiconductors), $n$=number of charge carriers per cc., and $e$=electron charge. Adjustment of R to optimize its value is common practice in making Hall elements. $\gamma=1$ for metals.

It is known that the Hall effect device or element is theoretically a wide band device. This is true since it will respond to D.C. and to A.C. frequencies introduced at the control current terminals or via the magnetic field up to very high frequencies. Its high frequency limit is recognized as the conductivity frequency, $\omega$, i.e., $$\omega = \frac{\sigma}{\epsilon}$$

where $\sigma$=conductivity in ohm$^{-1}$-cm.$^{-1}$ and $\epsilon$=dielectric constant of the semiconductor material. The inverse of this frequency is commonly known as the dielectric relaxation time constant of the material. This term for materials used as Hall effect elements is in the order of $10^{-11}$ sec. and therefore it is not a limiting factor up to frequencies of hundreds of kilomegacycles per second.

The magnetic concentrator (core material) has a relaxation time also which determines the maximum rate of build up and collapse of the magnetic field. Considering available ferro-magnetic materials as magnet materials, metals and ferrites provide means of magnetic concentration. Magnetic materials are known with constant permeability up to 2000 magacycles; there are ferrites which have constant permeabilities up to 20 and even up to 200 megacycles per second. This permeability determines the achievable magnetic field concentration, and therefore, it is an important factor in a Hall effect magnetic concentrator device in amplifying the input magnetic field radiation component. Magnetic concentrators responding to hundreds of megacycles are known and such characteristics are not a limiting factor in the frequency response of wide band Hall effect magnetic concentrator sensors.

Coils or loops of conductors cut by a magnetic field produce induced voltages in the conductors which are proportional to the area of the loop normal to the magnetic field, and the rate of change of magnetic field. Therefore, the voltage output of a given loop increases proportionately with frequency of the magnetic field oscillation. As shown in FIG. 1 when the voltage output due to conducting loops in the voltage output lead configurations of the Hall element in a magnetic circuit becomes equal to the Hall voltage output, the limit of frequency response of the magnetic concentrator, Hall effect apparatus, is reached due to this effect. FIG. 2 shows the Hall apparatus arrangement to obtain the values for FIG. 1 in which the Hall element or plate 2 mounted on substrate 3 which can be a ceramic or epoxide material is symmetrically placed on or secured to the pole face 4 of a magnetic core 5. Output leads 6 and 7 here are twisted in the air gap as well as in the outer fringing magnetic field designated by the numeral 10. Input leads are shown at 12 and 13. A quick calculation reveals that the voltage output of a pickup loop using the well known relation $$V = 10^{-8}\frac{Ad\phi}{dt}$$

versus frequency of the flux change varies linearly from 0 volts for 0 frequency to 4 $\mu$v. for 20 mc. for $B=10^{-5}$ gauss and an effective enclosed area of 4 cm.$^2$ where $t$=time, $\phi$=flux value, and $A$=area of the cross section (area cut by the flux).

Conductor loops associated with the Hall element in the gap of a magnetic concentrator will produce significant voltages which can limit Hall effect apparatus frequency response to low frequencies. Typically this limitation in presently known magnetic concentrator-Hall effect elements has been from 20 to 50 kc. For example, FIG. 1, also, shows the frequency response of a commercially available Hall probe, having a maximum capacity of .90 amp and in which the current input was 300 milliamps ($Ic$=300 ma.), which provides a flat response out to about 50 kilocycles per second when external circuitry is used to null out the internal pickup in this conventional configuration. In this case the high frequency excitation is applied to a ferrite core unit. In FIG. 1 curve 20 is flat to about 50 kc./sec. when it begins to pickup the inductive voltage as indicated by curve 21 (inductive pickup), so that from 50 kc. to 200 kc. the curve rapidly rises to show a voltage output of about 9.75 mv. (millivolts).

Over the years attempts have been made to design Hall magnetic concentrators for which the Hall element response predominates in the output voltage of the concentrator but they have been unsuccessful.

According to the present invention a novel design configuration has been discovered and which consists of the placement of the Hall effect element in the air gap of the magnetic concentrator (or magnet) geometrically asymmetrical to the gap or pole face so that one Hall element voltage output lead attachment projects outside the air gap and the other voltage output lead attachment on the opposite side of the Hall element is aligned exactly perpendicular to the control current flow lines in the Hall element and is folded over the element and both voltage leads protrude coplanar out of the air gap in a direction essentially exactly parallel to the magnetic flux lines (of the magnet) and perpendicular to the control current direction through the element.

Whereas previous constructions have used twisted leads to minimize inductive loop effects, the present invention uses essentially exactly aligned coplanar and parallel straight wires the plane of which is parallel to the magnetic flux lines in the air gap. These leads extend through the fringing field outside the air gap to a point where the magnetic field has become negligible and then the wires can be twisted from this point away from the Hall element. In modulator studies current excitation frequencies as high as 1 megacycle have been applied to the current input of the Hall element. However, this requires a balancing circuit and differs from the present apparatus arrangement in that the magnetic flux does not change at such frequency therefore a magnetic loop problem does not limit the performance of the present apparatus.

According to the present invention a specific design configuration of magnetic concentrator Hall element, lead configuration and geometrical relationship of Hall element and pole face of the magnet has been discovered which suppresses induction pickup voltage contributions to much less than the Hall element output voltage at frequencies of up to 10 megacycles per second. The design configuration of the present invention may only be limited by the decrease in permeability of magnetic materials as a function of increasing frequency up to even hundreds of megacycles.

It is not precisely known what occurs in using a Hall effect device constructed in accordance with the present invention but it is believed that any component of the loop area of the leads which is cut by a change in magnetic flux contributes an inductive pickup voltage, so that leads with loop areas equal to zero should be independent of frequency. Thus, it is felt that when in the Hall effect magnetic concentrator, the loop is placed outside the magnetic field, as in the above mentioned arrangement and provisions are taken to account for the non-uniform magnetic fields in the fringe area, then (1) The voltage contribution due to the loop will be some fraction of $1/\mu$ (when $\mu$=permeability of core) of that for the case of the loop inside the magnetic field; and (2) The use of straight wires aligned so as not to present a loop for the fringing non-uniform field to cut will minimize by several times the voltage contribution in this region which twisted wires would yield.

Given a permeability of 700, for example, for a magnetic ferrite core, the present advantageous geometrical placement of the Hall effect element with one Hall voltage contact protruding outside the air gap region will reduce the inductive pickup contribution for the same Hall effect element by a factor of one or two orders of magnitude providing the internal (inside the air gap) Hall voltage lead is folded under (or over) and essentially exactly aligned perpendicular to the current lines of flow.

An apparatus or device prepared in accordance with the present invention is shown in FIG. 3 in which generally toroidally shaped core 30 such as a ferrite core, containing insulated electrical windings 31 attached to a source of A.C. current (not shown) has two pole faces 32 and 33 defining an air gap 34. On one of the pole faces, preferably 33, is placed a Hall element or plate 35 which is of relatively thin cross section or thickness $38(t)$, which is usually rectangular in shape for the best performance, and in which sides 39 defining the length have dimensions about three times that of sides 40 defining the width. The ends of the sides 40 contain contacts, preferably electrodes 42, extending across the ends for attachment of current input leads 44 and 45. Useful electrode connections are shown in the U.S. Patent to Kuhrt, No. 2,877,394, dated Mar. 10, 1959. Voltage output contacts 47 and 48 are positioned midway or essentially midway of each side 39 and across from each other to minimize the D.C. output voltage present with no magnetic field. One contact 47, well within the direct magnetic field indicated by dotted lines 49, is connected to voltage output lead wire 50 which is bent perpendicularly up and straight over the top of the Hall element perpendicular to the current flow through the Hall element and parallel to the flux or magnetic field in the air gap. The other voltage lead 51 from contact 48 is perpendicular to the Hall element and core and is straight and parallel to lead 50. Both leads 50 and 51 are straight coplanar and parallel until they are outside of or substantially outside of the fringing magnetic field indicated generally by dotted lines 53 when they can be twisted together as shown at 55. One long edge 58 of side 39 is parallel or essentially parallel to an edge 59 of core 30. The area defined by sides 39 and 40 of Hall element 35 is less than or smaller than the area defined by air gap 34 or pole faces 32 or 33. Leads 44, 45, 50 and 51 should of course be insulated wherever it is necessary to avoid short circuits, etc. which would impair the performance of the apparatus. The apparatus of the present invention can be used for transient analysis, i.e., to measure currents in wire 62 passing through the open center 63 of the core.

As shown in FIG. 4 Hall element 35 is mounted on a substrate 65 such as a ceramic, epoxy, vinyl or other composition (which is magnetically transparent to magnetic lines of flux or essentially nonmagnetic and also provides electrical insulation for the Hall element and leads etc.) to adhere it to pole face 33 of core 30 so that the Hall element will not shift due to vibration, shock or other forces to change the characteristics of the apparatus. In the embodiment shown in FIG. 4, the leads 50 and 51 as they pass through the fringing field 53 are straight and vertically parallel (66). In the arrangement shown in FIG. 5 the output leads 50 and 51 are twisted in the fringe area 53 so that the benefits of the structure of the present invention are not shown as will be discussed below with respect to FIG. 6.

The results obtained by the practice of the present invention thus are shown graphically in FIG. 6. For example, curve 80 (dots in circles) represents the case of the Hall element being carefully prepared and being positioned in the center of the air gap or in the center of one pole face and where the voltage output leads are perpendicular to and parallel to each other from the Hall element itself out through the fringing area and then are twisted. This gives a flat frequency response up to about 200 kilocycles per second. By moving the probe (Hall element) to the edge of the pole face, long edge of Hall element essentially aligned edge to edge with pole face, as shown in FIG. 5 so that the output leads are twisted nevertheless in the fringe area of the magnetic field a flat frequency response up to about 1 megacycle is achieved (curve 81, dots in triangles). However, according to the present construction as exemplified by FIGS. 3 and 4, the uniform flat response is extended well past 2 megacycles per second and even up to 7 or more megacycles as shown by curve 82 (dots in squares). Thus, the inductive signal should equal the Hall output voltage at approximately 30 megacycles per second of the linear pickup voltage as shown in FIG. 6.

Thus, the present invention provides a design which includes an asymmetrical relation of the Hall effect device to its air gap such as to reduce pickup voltage by $(f)1/\mu$ where $f$ is a fraction of total loop area outside the gap, where $\mu$ is the permeability of the core, and a precisely aligned straight wire lead arrangement in the remaining fringing field region to eliminate spurious effects due to twisted leads in the non-homogeneous fringing field. According to the design of the present invention the inductive pickup voltage for 1 megacycle input to a coil on the concentrator has been reduced by more than 150 times. Through the present design the frequency response for the given example was increased from 50 kc. to $\cong 8$ megacycles.

It will be understood that since a decrease in Hall plate thickness increases the Hall voltage output for a given control current and magnetic field B in inverse proportion, Hall plates of 2–3 microns thick, which thickness is within the state of the epitaxy art for materials used for Hall plates, namely indium arsenide, can allow an increase of the output voltage of up to 25 times of that of normal Hall plates of 100 microns thickness. Since pickup voltages are only indirectly dependent on plate thickness (in the direction of decreasing pickup voltage contributions), the use of appropriate ferrite concentrators will increase the frequency response limit by approximately 20 times to over 100 megacycles per second.

Normally, thermal (Johnson) noise contributions to Hall output voltage are insignificant as follows:

$$V=\sqrt{4kTRB}$$

which for 300° K. and $R=2$ ohms and band width of 10 cycles leads to $10^{-10}$ v. compared to $5 \times 10^{-10}$ v. for Hall voltage at $10^{-5}$ gauss for a conventional Hall element. Because of magnetic concentration (assuming 1000 times amplification), the Hall voltage output is $5 \times 10^{-7}$ v. Clearly Johnson noise is not a limit for detection of $10^{-5}$ gauss in the magnetic concentrator Hall effect device. In the formula $R=$ohms, $B=$gauss, $T=$degrees Kelvin and $k=$the Boltzmann constant.

Since a thin film device of 2–3$\mu$ leads to $\cong 25$ times increase in resistance, the Johnson noise is increased to $2.5 \times 10^{-9}$ v. which is clearly still smaller than $5 \times 10^{-7}$ v.

FIGS. 7–11 show further modifications of the device of the present invention. While the pole face of the core is preferably square or rectangular, it can be round or star shaped or can have other configurations so long as the Hall element is at the edge of the pole face or as close thereto as possible (essentially or substantially at one edge of the pole face), the area of the Hall element as previously defined is less, preferably substantially less, than the area of the pole face, and the output leads (voltage output leads) of the Hall element essentially extend straight and coplanar (or coplanar and parallel) from the Hall element, parallel to the magnetic flux and perpendicular to the current flow in the Hall element from the Hall element and core out through the magnetic fringe area of the core when then they may be twisted together. The Hall element output leads should traverse a minimum amount of direct and indirect flux area of the concentrator. Accordingly, FIG. 7 shows a core having a pole face of circular or round design 90 in which the Hall element is positioned essentially at the outer edge or periphery of the core 90 and the leads 50–51 are parallel and perpendicular to the core itself until they are substantially or essentially out of the magnetic fringe area 53. FIG. 8 represents a further modification of the basic arrangement or design in which the pole face 33 of the core 92 is star-shaped and in which the Hall element 35 is positioned at the apex 95 of two legs 96–97 of the star-shaped core and the voltage output leads 50–51 extend from the apex area out through the fringe area 53 before they are twisted, if necessary, at 55. FIG. 9 represents a further modification of the apparatus shown in FIG. 8 wherein the Hall element 35 is positioned parallel to one edge of one leg 96 of the pole face and the voltage output leads 50–51 extend directly parallel and outward as described previously with respect to FIG. 4 before they are twisted at 55 substantially outside of the magnetic fringe area 53 of the core 92.

Figure 11:
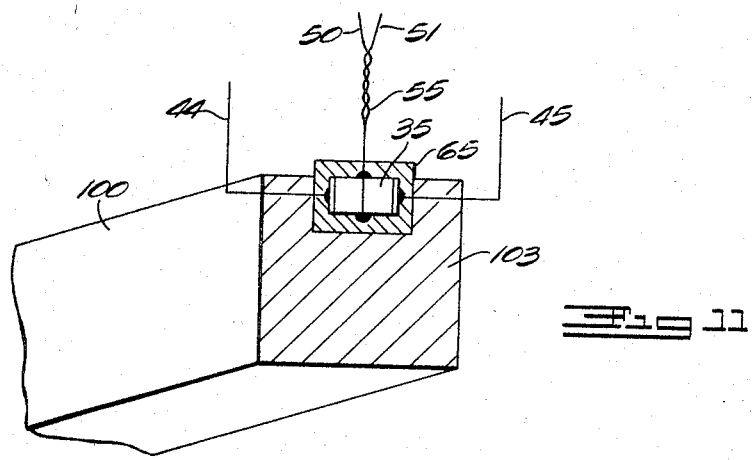
FIG. 11 is a perspective view of a portion of the device shown in FIG. 10.

FIGS. 10 and 11 show the application of the present invention to an antenna type of concentrator. Split antenna elements 100 and 101 provide an air gap 102 in which is mounted, preferably on one of the pole faces 103—103 of the apparatus, Hall element 35 constructed and positioned as shown in FIG. 4. The Hall element 35 is positioned at one of the outside edges of pole face 103 and the leads 50–51 extend parallel from the Hall element through the magnetic fringe area 53 until they are twisted at point 55 if necessary.

Figure 12:
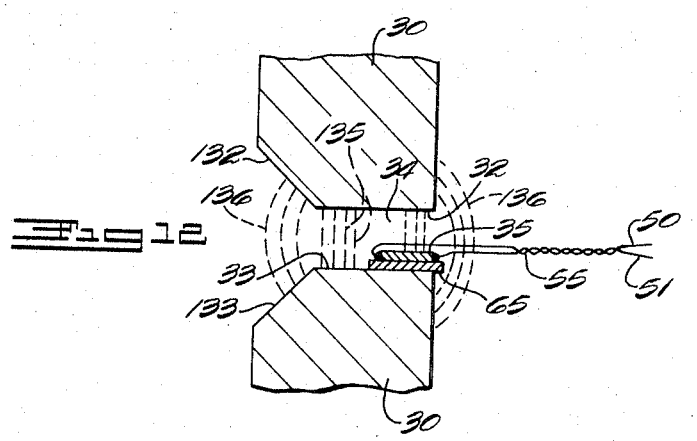
FIG. 12 is a vertical cross sectional view of a further embodiment of the present invention in which the design of the core has been modified to provide increased magnetic flux through the Hall element.

FIG. 12 illustrates a fuurther modification in which core 30 has been modified to provide pole faces 32 and 33 with outwardly tapering side portions 132 and 133. This concentrates the magnetic flux lines 135 between the pole faces in the air gap 34 where Hall element 35 is positioned. The magnetic fringe areas are at 136. Here outlined put leads 50 and 51 are twisted out of the magnetic fringing area.

As pointed out above, the large area face(s) of the Hall element should, preferably, be less or be substantially less than the area of the pole face(s) of the magnet for best results. However, the large area face(s) of the Hall element can be larger than the pole face(s); an apparatus with such an arrangement will be operable at high frequency but its linearity will not be as good. This will be substantially true where they only partially overlap. Where the Hall element and the pole face are of the same size in area, there will be inductive pickup, although having the leads coplanar and parallel to the field in the fringing area will afford some benefits. Also, a bar or other magnet can be used as the concentrator where the return flux is through the air.

Figure 13:
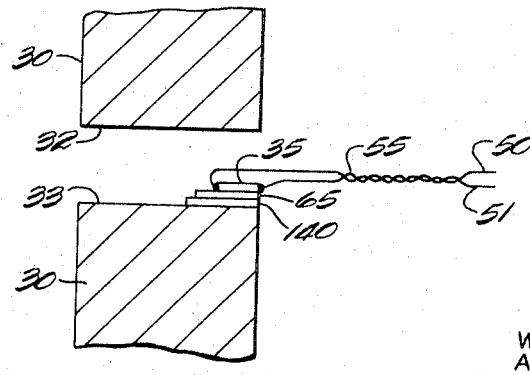
FIG. 13 is a cross sectional view of a method of securing the Hall element as described herein to the surface of the pole face.

FIG. 13 shows that the Hall element 35 may be laminated or secured to an epoxy (adhesive or cement) layer 65 which in turn is combined with a ceramic layer 140 to secure the Hall element 35 to the face or surface 33 of the pole of the core 30. Other methods can be used to adhere the Hall element to the face of the pole. These materials for the adhesive and ceramic may be replaced by a ferrite composition.

Although the Hall element can be a conductor, it is preferred that it be a semiconductor and even more preferred that it be a high mobility majority carrier extrinsic semiconductor. Examples of materials used for making the semiconductors are germanium, gallium arsenide, indium arsenide, indium arsenide phosphide, indium antimonide, mercury selenide-mercury telluride, cadmium tin arsenide, silicon and bismuth. These semiconductor materials may be made by methods well known in the semiconductor art and may be doped with various elements or compounds as well known in the art. The selection of the semiconductor includes intrinsics with high mobility anisotropy; the type of semiconductor (P or N type as desired) to be used will be determined by the particular use to which the Hall apparatus is to be applied.

Any type of geometry of the Hall element can be used provided it is a 4-lead Hall element having 2-output and 2-input leads. The element can be square, asymmetrical and/or uneven, or have other shapes for special applications. Preferably the Hall element is relatively flat, plate-like or thin and generally rectangular, and has two opposed large area faces and two opposed small area side and longitudinal edge faces. The ratio of the voltage output side length to the current input side length should be at least 2:1 to obtain reasonable efficiencies, and preferably should be from about 2:1 to 4:1. More preferably, the voltage output side(s) of the Hall element is or essentially is three times the length of the current input side(s).

The contacts for the voltage leads are generally point contacts or contacts to ears, forming a part of the Hall element. The voltage output contacts should be across from each other to define equipotential lines of force (static field) and preferably are positioned as carefully as possible directly across from each other in the centers of the voltage output sides or as close as possible to the centers of the output sides to get maximum voltage and symmetrical behavior. The output voltage lead (such as 50 in FIGS. 3 and 4) across (or under) the Hall element should also follow the equipotential lines of force. FIG. 14 shows an element in which the voltage contacts 47–48 are not centered in Hall element 35, but lead 50 follows or defines the equipotential lines of force of the element.

FIG. 15 shows an asymmetrical (or glob-like) Hall element 145 in which the output lead 50 follows equipotential lines of force (between output contacts 47–48) which are not straight due to the configuration of the element and the equipotential force lines.

The voltage output leads should be parallel and in a plane parallel to the flux lines, generally one output lead is above the other to avoid further inductive pickup (small coupling loop). See FIGS. 3, 4 and 7–13. The voltage output leads do not necessarily have to be parallel as long as coplanar, that is, in the plane where no magnetic flux can cut them to avoid an inductive pickup. Folding one output lead over or under the element is generally immaterial provided there is no or essentially no inductive pickup. FIG. 16 shows that the output leads 50 and 51 of the Hall element are coplanar but not necessarily parallel. FIG. 17 shows that a magnetic inductive (coupling loop) pickup as represented by shaded area 150 can occur when leads 50 and 51 are not coplanar so that the magnetic lines of flux are cut. FIG. 18 shows a less desirable arrangement of apparatus since its behavior will be unsymmetrical but nevertheless one in which a further magnetic inductive pickup or a small coupling loop is avoided. As pointed out herein the voltage output leads as they extend away from the concentrator and Hall element should be coplanar and be parallel to the flux lines; they extend straight outward in such a fashion to a point where the magnetic flux (or fringing magnetic field area) per unit area has decreased at least more than an order of magnitude of the magnetic flux at the pole face or in the air gap (between the poles of the magnet) itself before they can be twisted together if desired.

The current input sides of the Hall element preferably have electrodes extending across the width of the input sides with the current input leads being preferably joined at the centers or midpoints of the electrodes by means of point contacts.

The semiconductor can be cut from a bulk crystal or poly crystalline material and polished to get the desired thickness and surface finish and can have a thickness of from about 1 to 5 mils. Thinner semiconductors provide more sensitivity and frequency response. By thin film techniques semiconductor crystals can be made as thin as about 1 to 2½ microns. By using epitaxy techniques and suitable substrates single crystal semiconductors may be grown.

The substrates may be insulating, semi-insulating and/or non magnetic; they may be a single crystal or may be amorphous; and they can be ceramic or ferrite materials, sapphire, quartz, etc. Where single crystal semiconductors are being formed, the substrate should have a compatible lattice constant or structure as is desired in the semiconductor. In some cases using suitable substrates, adhesives may not be required between the substrate and the pole face.

Adhesives may be used to secure the substrate to the pole face or to the element, or where a substrate is not used, they may be used to secure the Hall element or semiconductor directly to the pole face itself. The adhesive (or cement) should be insulating or semi-insulating and should retain its strength, adhesiveness and cohesiveness at operating temperatures and conditions. It, also, preferably should be non magnetic. It should also be curable or set at temperatures below those which might change the characteristics of the semiconductor or the substrate when used and should not react with the substrate or semiconductor to adversely affect the properties of either material. Examples of adhesives are epoxides, phenolformaldehyde resins, melamine resins, silicones, polyester resins, poly-urethanes, polyamides, casein compounds, urea-formaldehyde compounds, polyacrylates, ethyl cellulose, vinyl resins which may be plasticized (such as polyvinyl acetal, polyvinyl acetate, polyvinyl chloride, polyvinyl chloride-acetate, etc.), polystyrene, chlorinated rubber, and so forth. The Hall element also may be encapsulated with one or more of the polymers or resins described above if desired.

The core or concentrator should be a magnetically soft material and have little or no retentivity, i.e., be a low retentivity material. It, also, should have a uniform permeability from low frequency to high frequency, for example, from D.C. to 100 megacycles or more. Examples of useful materials are powdered iron and, especially, the ferrites such as the manganese zinc ferrites, manganese magnesium ferrites, nickel zinc ferrites and so forth. The air gap between the poles is approximately the thickness of the layer of the semiconductor assembly (substrate and/or adhesive when used) although it can be somewhat larger. Various techniques are available to reduce the air gap. The core can be made by conventional techniques. For example, one method of making the core is by powder metallurgical procedures.

Thus, the present invention is applicable to any magnetically operated device with output leads. Normally available Hall elements of purported non-inductive design can show considerable improvement in magnetic circuit applications using the principles of the present invention. Any arbitrary 4-terminal Hall element or Hall effect apparatus with non-inductive lead arrangements between output voltage contacts will show marked improvement by means of the present invention. For example, the principles of the present invention can be applied to a magnetoresistance device, as shown in FIG. 19 wherein an electrical current is passed through current leads 200 and 201, and through semi-conductor 202 on pole face 33, a voltage difference or output is obtained between the two leads under the magnetic flux, and which can be measured.

The apparatus of the present invention is useful in the detection of electromagnetic radiation from space or from nearby wires, in the computer art, in multiplexing for telephone systems, in separating out frequency components, in electronic multiplication, etc. The present invention is particularly applicable to analog computers. The present invention can provide an improvement in semi-conductor properties at low temperatures even down to about 50° Kelvin. The current applied to the core can be D.C. or can be an A.C. or varying or oscillating current to provide a static A.C., varying or oscillating flux in the air gap while the current applied to the current input leads is A.C., varying, oscillating or D.C. Suitable electrical circuits for utilization of the apparatus of this invention are known to the art. For example, in the apparatus of the present invention, the control current of the element can be maintained constant so that the Hall voltage is a function of the magnetic field. Such apparatus is useful in field probes and permits the sampling of largely inhomogeneous fields and tangential fields. Since the Hall element is so narrow, it can readily be used for measuring the magnetic field in extremely narrow air gaps. A magnetic field may also be stabilized by controlling the field excitation current with the Hall voltage delivered by the Hall element when placed in the field. A particularly important application is the measurement of high direct currents by means of the magnetic field that they generate (yoke probes). In another application, the Hall voltage is influenced by an alternating field. A D.C. control current may in this way be converted into an A.C. Hall voltage proportional to the alternating field (vibrator inverter). An R.F. control current applied to the Hall element may be modulated with a control field oscillating in step with an audio frequency (Hall modulator). In another use a control current variable and a magnetic field variable can be converted into a proportional electrical quantity viz. the Hall voltage (Hall multiplier). Thus it is possible to form products, reciprocals and quotients. Simple examples of this are the measurement of power from current and voltage and the measurement of the torque of a D.C. motor from air gap induction and armature current. Hall multipliers may also be used for determining the products and quotients of physical quantities that are convertible into proportional electrical currents. Further applications include the generation of oscillations at the low end of the spectrum by feeding the Hall voltage back to the excitation of the magnetic field (Hall oscillator) and the direct harmonic analysis of periodic waveforms. By the use of certain electrical circuits the Hall voltage output may be employed to determine current output.

What is claimed is:

1. An apparatus, responsive to magnetic field excitation of from low to greater than ten megacycles per second frequencies, whose output, for a given amplitude of H field, is essentially independent of frequency, comprising a high frequency responsive magnetic concentrator having a pole face, a magnetic field sensitive element selected from the group consisting of a high mobility majority carrier extrinsic semiconductor and an intrinsic semiconductor having high mobility anisotropy mounted asymmetrically on said pole face, one edge of said element being positioned at one edge of said pole face, output leads attached by contacts to said element, one output lead being in contact with said element edge positioned at one edge of said pole face, the other output lead being bent across said element to the contact of the lead at said edges, said leads extending parallel to one another, the plane so formed by said leads being coplanar to the flux lines of said concentrator, straight in the plane parallel to the plane of said pole face, to a point where the magnetic flux per unit area has decreased at least more than an order of magnitude of the magnetic flux at the pole face.

2. A Hall effect apparatus, responsive to magnetic field excitations of from low to greater than 10 megacycles per second frequencies, whose output, for a given amplitude of H field, is essentially independent of frequency, comprising a high frequency responsive magnetic concentrator having two pole faces defining an air gap to provide a magnetic field; a magnetic field sensitive element selected from the group consisting of a high mobility majority carrier extrinsice semiconductor and an intrinsic semiconductor having high mobility anisotropy mounted asymmetrically in said air gap and with respect to said pole faces; said element having a generally rectangular flat shape comprising two opposed large area faces, two opposed side edge faces and two opposed longitudinal edge faces, the area of each of said opposed large area faces being less than the area of each of said pole faces, one of said opposed longitudinal edge faces being positioned at one edge of one of said pole faces; each of the two opposed side edge faces containing electrodes across their faces and each electrode containing a current input lead essentially midway of said electrode; each of said longitudinal edge faces having a conducting voltage output lead attached substantially midway of each of said longitudinal edges faces; one of said output leads being straight and perpendicular to the longitudinal edge face adjacent said edge of said pole face; the other of said output leads being bent straight about and across one of said opposed large area faces, parallel to the said opposed side edge faces, perpendicular to said longitudinal edge faces, parallel to the lines of magnetic flux between said pole faces, and in a direction to the attachment of said first named output lead to said element; said output leads extending parallel to one another, and the plane so formed by said leads being coplanar to the flux lines of said concentrator, straight in the plane parallel to the plane of said pole face for at least a substantial distance from said concentrator, through the fringing flux field of said concentrator to a point where the magnetic flux per unit area has decreased at least more than one order of magnitude of the magnetic flux in the air gap; and said output leads being twisted together beyond said point and beyond said concentrator.

3. An apparatus according to claim 1, in which said magnetic concentrator has two pole faces defining an air gap to provide a magnetic field.

4. An apparatus according to claim 3 in which said element has additionally two current input leads and in which the output leads are voltage output leads.

5. An apparatus according to claim 4 in which each current input lead is attached essentially midway to an electrode extending across the face of each current input side of said element.

6. An apparatus according to claim 5 in which said concentrator comprises an antenna.

7. An apparatus according to claim 6 in which said antenna is a split antenna.

8. An apparatus according to claim 5 in which the pole faces are round.

9. An apparatus according to claim 5 in which the pole faces are star-shaped.

10. An apparatus according to claim 9 in which said element is positioned on one of the legs of said star-shaped pole faces.

11. An apparatus according to claim 9 in which said element is positioned at the apex of two of the legs of said pole face and in which one output lead is adjacent the edge of said apex.

12. An apparatus according to claim 5 in which a portion of the pole faces are tapered away from each other to provide a concentrated magnetic field and in which the remaining portions of the pole faces are essentially flat defining said air gap.

13. An apparatus according to claim 5 in which said concentrator has a generally toroidal shape, contains varying current windings and comprises a ferrite material.

14. An apparatus according to claim 12 in which said apparatus is a wide band apparatus and in which said element is selected from the group consisting of thin film semiconductors and epitaxially grown semiconductors.

15. An apparatus according to claim 14 in which said element has a thickness of from about 2 microns to 5 mils.

16. An apparatus according to claim 15 in which the output leads are twisted substantially outside of the fringing magnetic area of said concentrator.

17. A Hall effect apparatus according to claim 2 in which the ratio of the length of said two opposed longitudinal edges faces to said two opposed side edge faces is at least 2:1.

18. A Hall effect apparatus according to claim 17 in which said ratio is from about 2:1 to 4:1.

19. A Hall effect apparatus according to claim 18 in which said ratio is essentially 3:1.

20. A Hall effect apparatus according to claim 19 in which the current to the magnetic circuit is in the range of from $10^{-6}$ to 200,000 amperes or in which the applied magnetic field is in the range of from $10^{-5}$ gauss to greater than 1000 gauss for frequencies from D.C. to greater than 10 megacycles and in which said concentrator has a generally toroidal shape, contains varying current windings and comprises a ferrite material.

References Cited

UNITED STATES PATENTS

| | | | |
|---|---|---|---|
| 2,877,394 | 3/1959 | Kuhrt | 317—234 |
| 2,988,650 | 6/1961 | Weiss | 307—88.5 |

JOHN W. HUCKERT, *Primary Examiner.*

M. EDLOW, *Examiner.*

CERTIFICATE OF CORRECTION

Patent No. 3,339,129                                       August 29, 1967

Warren E. Bulman et al.

It is hereby certified that error appears in the above numbered patent requiring correction and that the said Letters Patent should read as corrected below.

In the heading to the printed specification, line 5, for "Clinton, Ohio" read -- Clinton Township, Ohio --; column 3, lines 45 to 47, for $$= \frac{3\pi}{8} \quad \text{read} \quad \cong \frac{3\pi}{8}$$

column 11, line 40, for "extrinsice" read -- extrinsic --; column 12, line 37, for the claim reference numeral "12" read -- 13 --; line 55, for the claim reference numeral "19" read -- 17 --.

Signed and sealed this 24th day of September 1968.

(SEAL)
Attest:

EDWARD M. FLETCHER, JR.                        EDWARD J. BRENNER
Attesting Officer                                  Commissioner of Patents